Aug. 13, 1935.  C. H. CARPENTER  2,010,915
ROASTER
Filed May 5, 1934
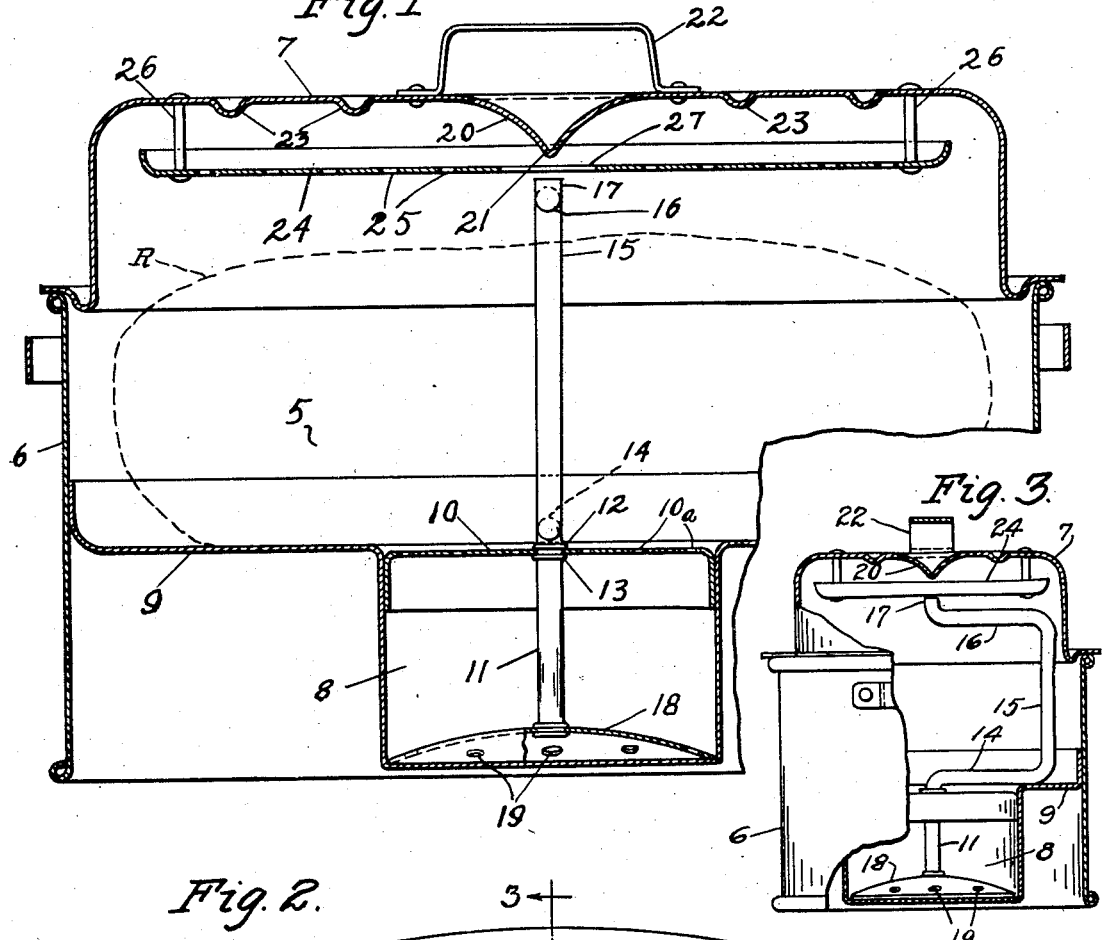
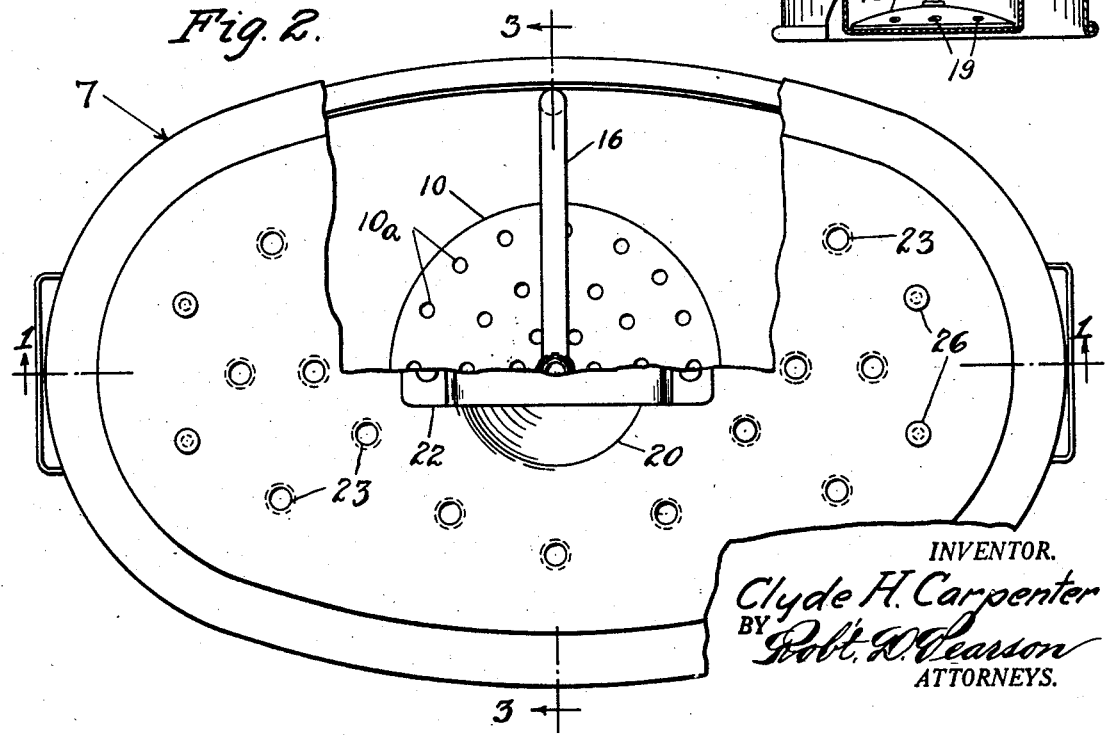
INVENTOR.
Clyde H. Carpenter
BY Robt. D. Pearson
ATTORNEYS.

UNITED STATES PATENT OFFICE 2,010,915

ROASTER

Clyde H. Carpenter, Los Angeles, Calif.

Application May 5, 1934, Serial No. 724,107

4 Claims. (Cl. 53—6)

This invention relates to roasters and other cooking utensils.

An object of the invention is to provide a roaster furnished with means to apply hot liquid of an oily nature to the surface of the meat, or other foods, in an improved manner while the cooking of the meat is taking place, in order that the meat may be roasted in a more even and satisfactory manner.

Still other objects, advantages and features of the invention may hereinafter appear.

With the above objects in view a container is provided, said container having means within it to collect the roasting fluid; and also a liquid circulating device, operated automatically by the action of the heat upon the liquid to collect the liquid and cause it to be distributed over the food being roasted.

The invention further includes an improved cover construction to cooperate with other parts of the device in such a manner as to cause the heated liquid to be applied more evenly to the top surface of the meat during roasting.

Referring to the accompanying drawing, which illustrates what is at present deemed to be a preferred embodiment of the invention:

Fig. 1 is a vertical mid-section of the complete device on line 1—1 of Fig. 2, part being broken away to contract the view.

Fig. 2 is a plan view thereof, part of the cooker being broken away to show underlying structures, and another portion of the structure being broken away to contract the view.

Fig. 3 is a fragmental vertical section on line 3—3 of Fig. 2.

Referring in detail to the drawing, the roasting chamber 5 occupies the space between the body portion 6 of the utensil and its cover member 7. As shown in the drawing the receptacle body 6 is furnished with a sump 8, said sump consisting of a circular depression in the central portion of its bottom 9.

The sump 8 is covered by a foraminated strainer plate 10 having openings 10a, which is shown as being fastened to a percolator element which comprises an open-ended tube 11, which may be furnished with annular beads 12 and 13 to connect it with said plate 10. Said tube 11, just above the plate 10, as viewed in Fig. 1, is furnished with a large laterally directed U-shaped bend consisting of a lower, laterally directed run 14, an upwardly directed portion 15 and an upper lateral run 16 which brings the tube back to the center of the device, said run 16 terminating in a short upwardly directed terminal discharge portion 17.

The tube is deflected in a manner stated to prevent it from unduly obstructing the space occupied by the roast R, indicated by dotted lines. Said tube 11 has attached to its lower end a base plate 18 which approximately fits within the lower part of the sump and which has a few perforations 19 near its periphery, this construction of the tube and base plate serving to cause the heat to produce an upward current of liquid through the tube, according to a well understood principle.

The central portion of the cover 7 carries a downwardly extending liquid spreader or sprayer 20 having a downwardly directed apex or tip portion 21 which is positioned directly above and adjacent to the discharge end of the tube tip 17 to spread the discharged liquid transversely in all directions. The upper wall of the cover is shown depressed at the center in order to form the liquid spreader element, but it is obvious that said spreader may be separately formed if desired. In either case it should have a lower surface of a character which will not obstruct the lateral movement of liquid directed upwardly against its apex.

An upwardly extending handle 22 is shown secured to the central portion of the cover. The top wall of the cover carries a plurality of downwardly extending projections 23 positioned to intercept the sprayed liquid in order that it drop from said projections upon the upper surface of the distributing tray 24 which is secured to the cover 7 by hangers 26. The tray 24 is provided with an opening 27 through which the liquid from the discharge tube 17 is admitted. The perforations 25 are distributed through the tray 24 to evenly distribute the basting fluid over the food being roasted or cooked.

The projections 23 are shown as being indentations of the cover well adapted to be pressed thereinto by means of a die at the same time that the central depression for the spreader 20 is formed.

I claim:

1. In a device of the kind described, a casing construction providing a roasting chamber, and a percolator element mountable within said casing construction to convey heated liquid from the bottom portion thereof and eject it towards the top portion of said casing construction, there being a spreader element with an unobstructed liquid-engageable surface in the upper portion of said roasting chamber to spread the liquid ejected from said percolator element, said spreader element being downwardly tapered to a tip which is positioned to spread the liquid ejected from said spreader element.

2. In a device of the kind described, a casing construction providing a roasting chamber having a centrally and downwardly indented top wall tapering from all sides to an apex and having an unobstructed surface to act as a liquid spreader, and a percolator element mountable within said chamber and positioned to discharge heated liquid against the apex of said spreader, whereby the liquid is diverted outwardly in all directions.

3. In a device of the kind described, a casing construction providing a roasting chamber having a centrally and downwardly indented top wall liquid spreader and adapted to spread the liquid transversely from a single point toward all sides of said chamber, and a percolator element mountable within said chamber to discharge heated liquid upwardly against said spreader, there being a plurality of downward projections provided in the upper portion of said chamber to intercept the outward movement of the spread liquid, after it leaves said spreader.

4. In a device of the kind described, a casing construction having therein a cooking chamber, a percolator mounted within said chamber to collect liquid therefrom and discharge it upwardly in the upper portion thereof, a liquid spreader means positioned in the path of the discharge end of said percolator and adapted to spread the discharge liquid transversely toward all sides of said chamber, and an auxiliary liquid discharging means to deliver said liquid upon food within said chamber, said auxiliary liquid distributing means consisting of a transversely extending plate mounted in spaced relation to the top wall of said chamber.

CLYDE H. CARPENTER.